R. C. BERRY.
BAND SAW TENSOMETER.
APPLICATION FILED MAR. 8, 1919.
1,323,818.
Patented Dec. 2, 1919.
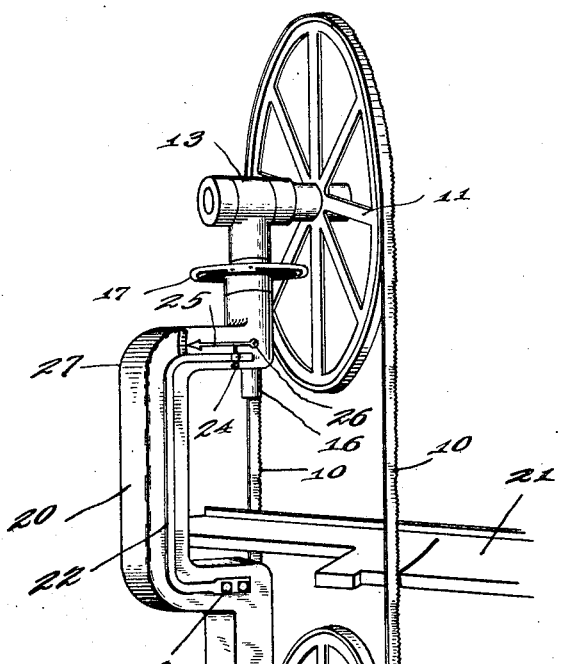
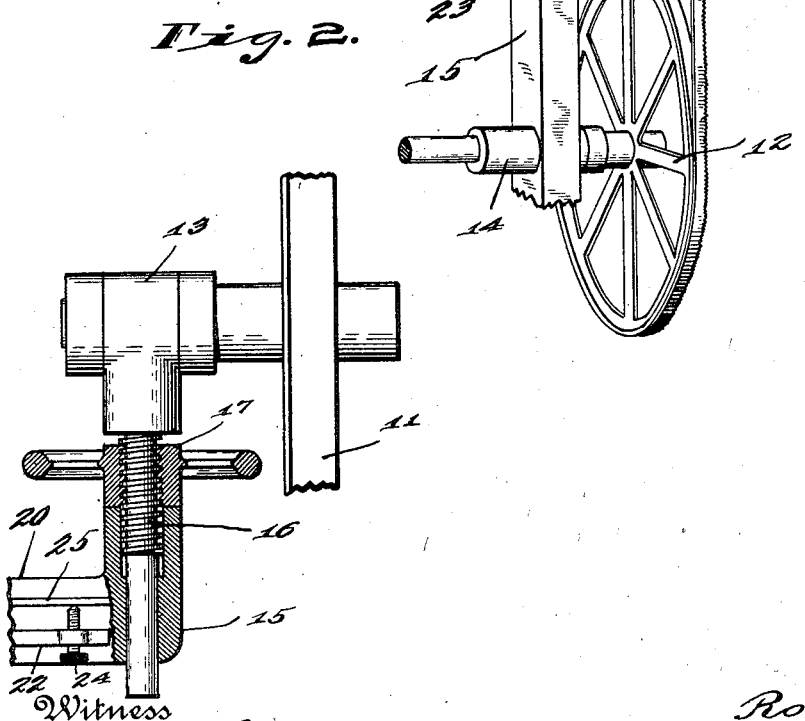
Witness
Frank A. Fahle
Inventor
Robert C. Berry,
By Hood & Ashley.
Attorneys

UNITED STATES PATENT OFFICE.

ROBERT C. BERRY, OF INDIANAPOLIS, INDIANA, ASSIGNOR TO E. C. ATKINS & COMPANY, OF INDIANAPOLIS, INDIANA, A CORPORATION OF INDIANA.

BAND-SAW TENSOMETER.

1,323,818. Specification of Letters Patent. Patented Dec. 2, 1919.

Application filed March 8, 1919. Serial No. 281,415.

*To all whom it may concern:*

Be it known that I, ROBERT C. BERRY, a citizen of the United States, residing at Indianapolis, in the county of Marion and State of Indiana, have invented a new and useful Band-Saw Tensometer, of which the following is a specification.

In the operation of band-saws, the tension given the saw has usually been a matter of guess-work, and frequently the adjustment for the saw tension has been made too tight or too loose; in fact, it is a question whether the saw tension is not usually wrong, since there is no convenient means for indicating it.

It is the object of my invention to provide a tensometer for indicating constantly and automatically the tension of the band saw, so that such tension may be made and maintained anything desired, and so that in case the tension is increased from any cause the tensometer will give an exact indication thereof and thus guard against breakage.

In accomplishing this object, I provide an offset in the post connecting the bearings for the upper and lower band wheels, so that by flexure at this offset the distance between two points on this post is varied inversely as the tension of the band saw, which is carried by such two band wheels; so that by providing another member which in independent of such flexure, and connecting it and the post through an indicating device, the flexure of the post offset and therefore the tension of the saw are indicated.

I have shown my tensometer in connection with a swing band-saw machine such as is shown in my prior Patent No. 1,287,193, granted December 10, 1918, in which the post connecting the two band-wheel bearings is provided with an offset in the plane of the work upon which the saw operates so that the post will clear the work, and the same offset is used for obtaining the flexure which operates the tensometer; but my tensometer is not limited to a swinging band-saw machine, as it is applicable to band-saw machines of any type.

The accompanying drawing illustrates my invention: Figure 1 is a perspective view of a band-saw machine equipped with my tensometer, only such parts of the band-saw machine being shown as are necessary to the understanding of the action of such tensometer; and Fig. 2 is a detail of the adjustment for the bearing for the upper band wheel.

The band saw 10 is carried by upper and lower band wheels 11 and 12, which are mounted in suitable bearings 13 and 14 at the upper and lower ends of an upright or post 15. The upper bearing 13 is vertically adjustable on the post 15, to vary the tension of the band saw 10; as shown, this bearing 13 is mounted on the upper end of a screw 16 having a guiding mounting in the upper end of the post 15 and coöperating with an internally threaded thrust wheel 17 which presses against the upper end of such post, as is clear from Fig. 2, so that by turning the thrust wheel 17 the distance between the bearings 13 and 14 may be varied.

The post 15 is provided at an intermediate point with a U-shaped offest portion 20. In swinging band-saw machines, where the work is stationarily supported on the table 21, this offset 20 permits the post 15 to clear the work as the swinging member of the band-saw machine is swung back and forth, as explained in my aforesaid patent, such post and the band saw forming part of such swinging member.

A U-shaped member 22, made U-shaped for this same reason of obtaining clearance, lies closely beside the offset portion 20. This U-shaped member 22 is fastened to the post 15 at its lower end, as by screws 23; but is free of such post elsewhere, so that it does not partake of any flexure which may occur in the offset portion 20 of the post. Mounted in the upper free end of the U-shaped member 22 is a thumb-screw 24, for adjusting the indicator; and the upper end of this thumb-screw 24 presses against the under face of a pointer 25 pivoted on the post 15 at a point 26, from which the thumb-screw 24 is not far distant, so that relatively slight movements between the point 26 and the thumb-screw 24 produce relatively large movements of the free end of the pointer 25, which free end swings over a suitable scale 27 carried by the post 15.

In operation, as the tension of the saw 10 is varied, as by the adjustment of the thrust wheel 17 or in any other manner, an increase in such tension produces a flexure of the offset portion 20 of the post 15 to bring the point 26 and the point to which the screws 23 are attached closer together, while a decrease in such tension causes the elasticity of said offset portion 20 to separate such point 26 from the screws 23. As the U-shaped member 22 does not partake of this flexure of the U-shaped portion 20, this variation in the height of the point 26 with relation to the screws 23 involves a variation in the relative heights of the point 26 and the thumb-screw 24, which causes the free end of the pointer 25 to move over the scale 27 in accordance with such flexure; the pointer rises on such scale as the tension of the saw and the flexure of the U-shaped portion 20 increase, and vice versa. Thus the height of the pointer 25 on the scale 27 indicates the tension of the saw 10, and guides the operator in his adjustment of such tension by the thrust wheel 17, so that the proper tension may be obtained without danger of breaking the saw. In case the tension of the saw departs from the desired value in operation, this is immediately indicated by the pointer 25, so that the operator may make proper compensation therefor by manipulating the thrust wheel 17.

I claim as my invention:

1. In a band-saw machine, the combination of two band wheels, a post in which said wheels are revolubly supported, said post being provided with an offset portion between said two wheels, a member fixed to said post at one side of said offset portion and free therefrom at the other side thereof, and an indicator responsive to relative movements between the free end of said member and an adjacent part of said post.

2. In a band-saw machine, the combination of two band wheels, bearings therefor, a post in which said bearings are mounted, means for adjusting the distance separating said bearings on said post, said post being provided between said bearings with a portion which is variable in length upon variations in the tension of the band saw carried by said two band wheels, a member fixed to said post at one side of said variable-length portion and free from such variations in length, and an indicator responsive to variations in the relative positions of the other side of said variable-length portion and of said member.

3. In a band-saw machine, the combination of two band wheels, bearings therefor, a post in which said bearings are mounted, means for adjusting the distance separating said bearings on said post, said post being provided between said bearings with a portion which is variable in length upon variations in the tension of the band saw carried by said two band wheels, and an indicator which is operable by variations in the length of said variable-length portion.

4. In a band-saw machine, the combination of two band wheels, bearings therefor, a post in which said bearings are supported, means for adjusting the distance between said bearings on said post, said post being provided between said bearings with a laterally offset portion which by reason of its shape will vary in length upon variations in the tension of the band saw carried by said band wheels, a member conforming in general to the shape of said offset portion and attached to the post at one end only of said offset portion, and an indicator interconnecting the other end of said offset portion and the free end of said member so that it is operated by variations in the length of said offset portion.

5. In a band-saw machine, the combination with the two band wheels and their bearings, of a member connecting said two bearings and provided with a portion which is variable in length by flexure upon variations in the stress exerted between said bearings by the tension of the associated band saw, and an indicator which is operable by variations in the length of said variable-length portion.

6. In a band-saw machine, the combination of two band wheels, a post in which said wheels are revolubly supported, means for adjusting the distance between the supporting points for said wheels along said post, said post being provided with an offset portion between said two wheels, a member fixed to said post at one side of said offset portion and free therefrom at the other side thereof, and an indicator responsive to relative movements between the free end of said member and an adjacent part of said post.

7. In a band-saw machine, the combination of two band wheels, a post in which said wheels are revolubly supported, said post being variable in length by flexure under the stress exerted between said band wheels by the tension of the associated band saw, and an indicator responsive to such variations in length by flexure.

8. In a band-saw machine, the combination of two band wheels, a post in which said wheels are revolubly supported, said post being variable in length by flexure under the stress exerted between said band wheels by the tension of the associated band saw, an indicator responsive to such variations in length by flexure, and means for adjusting the distance along said post of the points of support for said two band wheels.

In witness whereof, I have hereunto set my hand at Indianapolis, Indiana, this fourth day of March, A. D. one thousand nine hundred and nineteen.

ROBERT C. BERRY.